United States Patent Office 3,290,259
Patented Dec. 6, 1966

3,290,259
HETEROCYCLIC POLYMERS OF DIAZADIPHOS-PHETIDINE DIOXIDE UNITS
Leo P. Parts and Morris L. Nielsen, Dayton, Ohio, assignors to Monsanto Research Corporation, St. Louis, Mo., a corporation of Delaware
No Drawing. Filed Nov. 26, 1963, Ser. No. 326,232
13 Claims. (Cl. 260—2)

This invention relates to heterocyclic polymers, and more particularly provides new and valuable polymers containing a diazadiphosphetidine dioxide unit in the polymer chain and methods of preparing the same.

An object of the invention is to prepare highly heat-resistant polymeric compounds. Another object of the invention is the provision of polymers having very good resistance to solvents. Still another object is the provision of moldable compositions having high thermal stability. A further object of the invention is the provision of a new method of particular utility for the preparation of moldable and extrudable polymers of high stability to heat and solvents. Still another object is the preparation of thermally stable adhesives. A most important object is the preparation of laminating agents for high-temperature applications.

These and other objects hereinafter defined are provided by the invention wherein there are prepared high molecular weight polymers by the reaction of an appropriate diamine with two molar equivalents of an aryldiimidazol-1-ylphosphine oxide substantially according to the scheme:

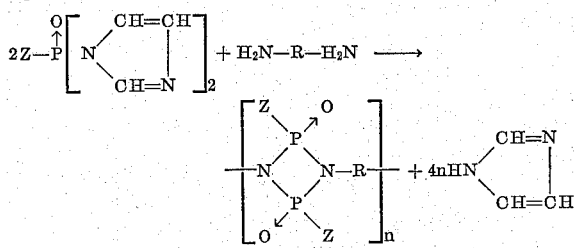

where Z in an aromatic hydrocarbyl radical which is free of olefinic and acetylenic unsaturation, contains from 6 to 12 carbon atoms, and is linked through nuclear carbon to the remainder of the molecule, and R is selected from the class consisting of (1) arylene, aryleneoxyarylene and polyaryleneoxyarylene of from 2 to 6 oxygen ether linkages, wherein each arylene radical is hydrocarbon, is free of olefinic and acetylenic unsaturation, contains from 6 to 12 carbon atoms and is linked through non-adjacent nuclear carbon to the remainder of the molecule, and (2) heterocyclic radicals having from 3 to 18 carbon atoms, from 5 to 6 members in a ring and from 1 to 3 nuclear tertiary nitrogen atoms with the rest of the members being aromatic carbon, and being free of olefinic and acetylenic unsaturation and linked through non-adjacent, nuclear carbon to the remainder of the molecule, and $n$ denotes the degree of polymerization.

As shown in the above reaction scheme, the aromatic or heterocyclic diamine condenses with the aryldiimidazolyl-1-ylphosphine oxide with evolution of imidazole, and formation of the diazadiphosphetidine dioxide structure by bridging of the remaining

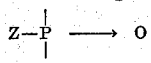

moiety between the amino nitrogens of two molecules of the diamine.

The aryldiimidazol-1-ylphosphine oxides which are employed for preparing the presently provided polymers and the method of making them are disclosed in the copending application of R. Z. Greenley and M. L. Nielsen, Serial No. 294,179, filed July 10, 1963, now U.S. Patent No. 3,227,727, issued January 4, 1966. As shown in said application, they are obtained by the reaction of an appropriate phosphonic dihalide with imidazole, as follows:

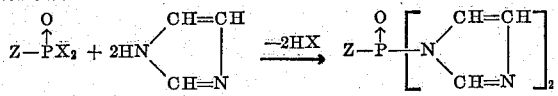

wherein Z is the aromatic hydrocarbyl radical defined above and X is halogen having an atomic weight of at least 35. The reaction is effected by simply mixing the two reactants, advantageously in the presence of a basic agent to serve as hydrogen halide scavenger, and allowing the resulting mixture to stand until formation of said phosphine oxide is completed. Operating temperatures of, say, from 60° C. to 150° are useful, and an inert, organic liquid diluent or solvent such as tetrahydrofuran is conveniently employed.

Examples of the presently useful phosphine oxides are diimidazol-1-ylphenyl-, diimidazol-1-yl-o-, m- or p-tolyl-, diimidazol-1-yl-(o-, m- or p-isopropylphenyl-), diimidazol-1-yl-(p-hexylphenyl)-, (3,4- or 4,5-diethylphenyl)diimidazol-1 - yl-, diimidazol - 1-yl-(pentamethylphenyl)-, (o-, m- or p-cyclopentylphenyl)diimidazol-1-yl-, o-, m- or p-biphenylyldiimidazol-1-yl-, diimidazol-1-yl-α- or β-naphthyl-, or 3-acenaphthenyldiimidazol-1-ylphosphonic oxide.

The diamines with which the aryldiimidazol-1-ylphosphine oxides are reacted are generally compounds in which two primary amino groups are bridged by a hydrocarbon arylene or aryleneoxyarylene or polyaryleneoxyarylene radical or a nitrogen heterocyclic ring.

Examples of presently useful arylene diamines include o-, m- or p-phenylenediamine, benzidine, 2,2'-, 3,3'-, 3,4'-, 2,4- or 2,4'-diaminobiphenyl, 5,6-acenaphthenediamine, 2,7-fluorenediamine and 1,4- or 1,5-naphthalenediamine. The polymeric compounds thus obtained contain the repeating unit

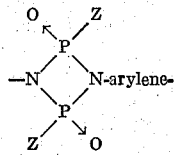

The arylene group may or may not contain aliphatic or cycloaliphatic substituents, e.g., the diamine may be toluene-2,4- or 2,5- or 2,6- or 3,5-diamine, 2,4,6-triethyl-m-phenylenediamine, 3,5 - dimethyl-p - phenylenediamine, 2,5 - di-tert-butyl-p - phenylenediamine, diaminodurene, 2,2' - diethylbenzidine, 3 - hexyl-p - phenylenediamine, 3-cyclopropyl-p-phenylenediamine, 4 - cyclohexyl-m-phenylenediamine, 2-ethyl-1,4-naphthalenediamine, etc.

The useful aryleneoxyarylene diamines include, e.g., 3,3' or 4,4'-oxydianiline, bis(p-amino-o-methylphenyl) ether, bis(m - amino - 4 - biphenylyl) ether, bis(amino-fluoroenyl) ether, bis(α-amino-β-naphthyl) ether, etc. The polymeric compounds thus contain the repeating unit:

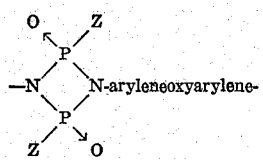

Examples of useful polyaryleneoxyarylene diamines are polyphenyl or poly(alkylphenyl) ethers containing from 3 to 7 phenyl groups and from 2 to 6 oxygen linkages and nuclearly substituted at non-adjacent carbon atoms by a primary amino radical at each of the terminal phenyl rings such as p-bis(p-aminophenoxy)benzene, o-bis[(p-aminophenoxy)phenyl] ether or p-bis{p-[p(p-aminophenoxy)phenoxy]phenoxy}benzene or homologs thereof wherein one or more phenylene groups are substituted by alkyl groups. One or more of the arylene linkages may be biphenylylene or naphthylylene or acenaphthylylene groups.

The useful diamino heterocyclic compounds are those in which two primary amino groups are attached to a heterocyclic nucleus containing from 1 to 3 nuclear, tertiary nitrogen atoms with the remaining nuclear members being aromatic carbon, e.g., 2,4-, 2,5- or 2,6-diaminopyridine, 2,4-diaminopyrimidine, 3,6-diaminopyridazine, 2,4-, 3,5-, 4,6-, 4,8-diaminoquinoline, 4,6-diamino - 2,3, dimethylquinoline 2 - (2,4-diamino-6-methyl - 5-pyrimidinyl)quinoline, 2,4-diamino-s-triazine, 3,4-diaminobenzo(g)quinoline, 3,4-, 4,6,- 4-7- or 4,8-diaminocinnoline, 2,5-, 2,7- or 2,8-diaminoacridine, 3,6-diamino-2,7-dimethylacridine, etc. Polymers obtained from an aryldiimidazol-1-ylphosphine oxide and such heterocyclic diamines have the repeating unit

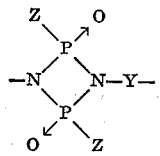

where Z is as defined above and Y is a heterocyclic radical having from 3 to 18 carbon atoms, from 5 to 6 members in a ring and from 1 to 3 nuclear, tertiary nitrogen atoms with the rest of the nuclear members being aromatic carbon, and being free of olefinic and acetylenic unsaturation and linked through non-adjacent, nuclear carbon to the remainder of the molecule.

Two or more different diamines may be reacted with the aryldiimidazol-1-ylphosphine oxide, e.g., a mixture of an arylene diamine such as p-phenylenediamine and a heterocyclic diamine such as 4,8-diaminoquinoline, or there may be used a mixture of two or more aryldiimidazol-1-ylphosphine oxides, e.g., a mixture of diimidazol-1-ylphenylphosphine oxide and diimidazol-1-yl-β-napthylphospine oxide to obtain polymers having various alternating linkages or differing linkages dispersed more or less randomly in the polymer chain. Such an expedient is useful in tailoring polymer structures having properties intermediate to those attributable to the individual linkages. For example, while the arylene linkage and the heterocyclic linkages are characterized by high thermal stability, with the higher arylene radicals such property may be usually obtained only at the expense of decreased mechanical strength. A plasticizing or toughening effect can be conferred by introducing aryleneoxyarylene or polyaryleneoxyarylene linkages into the molecule, together with the arylene linkages.

Reaction of the diamine with the two molar equivalents of the aryldiimidazol-1-ylphosphine oxide takes place with formation of the polymeric aryldiazadiphosphetidine dioxide and the production of four moles of by-product imidazole per polymer unit. The imidazole is generally recovered quantitatively in a substantially pure state and can be readily used for making a new supply of aryldiimidazol-1-ylphosphine oxide for the polymerization reaction.

Preparation of the presently provided polymers takes place by simply heating the diamine with substantially two molar equivalents of the phosphine oxide at a temperature of from, say, 100° C. to 400° C. at ordinary, decreased or increased pressure and in the presence or absence of a liquid diluent or solvent. The reaction takes place readily in the absence of a catalyst; however, a catalyst, preferably basic, may be employed. Operation in an inert atmosphere, e.g., under nitrogen or argon may be useful, particularly in experimental runs, but is not required. The nature of solvent or diluent will depend upon the specific reactants which are used as well as upon the temperature and pressure conditions. Virtually any liquid which is inert under the reaction conditions may be used as diluent; and as will be obvious to those skilled in the art, a low-boiling diluent generally will not be employed when the process is conducted at high temperatures or under substantially decreased pressure. That the solvent or diluent be inert under the reaction conditions is a requirement which eliminates, generally, compounds having a labile hydrogen, since such materials may react with the phosphine oxide and thus reduce or entirely suppress reaction with the present diamine reactant. The commonly known, comparatively unreactive materials such as the ethers, nitrohydrocarbons or the tertiary nitrogen heterocyclics are useful. Advantageously, for facilitating removal of the diluent, it should be one which is a solvent for the initial phosphine oxide compound and the diamine and a none-solvent for the polymer, or it should be volatilizable from the reaction mixture at a temperature which is below the decomposition point of the polymer. For working at the lower temperatures of the operable temperature range, solvents such as pyridine, nitrobenzene and diglyme are useful. Within the higher temperature ranges, solvents such as quinoline, phenyl ether and the polyphenyl ethers are conveniently employed. The use of a solvent will depend to some extent upon the nature of the reactants as well as upon the extent of heating. When both reactants are solids at the desired operating temperature, a diluent will be generally useful; on the other hand, when one or both of the reactants is a liquid or melts readily at the contemplated reaction temperature, a diluent need not be used unless the diamine is extremely reactive. In that case, the use of an inert diluent will serve to moderate the reaction.

As stated above, the temperature at which reaction is effected is variable; for here again must be taken into consideration the nature of the reactants, whether or not a catalyst and/or diluent is used, and the pressure at which the reaction is conducted. Some of the present polymerizations can be conducted by heating, say, at temperatures of from 100° C. to 150° C. at ordinary atmospheric pressure. In other instances, heating of the reaction mixture at higher temperatures, say, at temperatures of from 150° C. to 400° C. and preferably at from 200° C. to 250° C. will be found to give optimum conversion. All these variables, i.e., use of and nature of diluent, inert atmosphere, catalyst, temperature and pressure can be readily arrived at by easy experimentation. Since reaction may be evidenced by dissolution of the reactants, change in viscosity, precipitation of polymer, etc., the extent of such change will be indicative of reaction. Very rapid reaction, as evidenced by rapid viscosity change or foaming and gelling will show the need for a diluent and/or lower temperature and/or shorter heating and/or no catalyst if one has been employed. Conversely, no reaction or only very slow reaction will indicate the use of more extreme conditions. Thus, arrival at optimum reaction conditions is simply a matter of routine procedure well within the province of one skilled in the art. To assure complete reaction in experimental runs, it is generally recommended that the temperature of the reaction mixture be increased after primary evidences of reaction have subsided.

The by-product imidazole is a high-boiling (225–6° C.) material. Various procedures may be used for separating the polymer product therefrom, e.g., simple filtration or decanting and washing, solvent extraction, distillation, etc. The imidazole is generally much more soluble than the polymer; this fact permits easy removal of the imidazole by washing. However, since it is desirable to recover the imidazole in as high a state of purity as possible, it is convenient to apply vacuum to the system and to continue heating after the polymerization reaction has subsided in order to distill or sublime the imidazole. When the polymerization has been effected in the presence of a diluent or solvent, the latter is thereby also removed. Again, for the sake of economic operation, it is advantageous to employ a solvent or diluent whose volatility differs essentially from that of the imidazole; otherwise, a separation of imidazole from the diluent would be involved. When the polymerization has been conducted in the absence of a solvent or diluent and the reactants are employed in the stoichiometric proportions, generally the polymer remains in the reaction mixture as a suspension of solid in the imidazole. As pointed out above, it may be simply filtered off, washed and dried; or, the imidazole may be evacuated from the system.

To recapitulate: In the preparation of the diazadiphosphetidine dioxide polymers, substantially one mole of the aromatic or heterocyclic diamine is mixed with substantially two molar equivalents of the phosphine oxide and the mixture is heated, in presence or absence of a solvent or diluent or catalyst, at a temperature which may be as low as 100° C. and as high as, say, 400° C., at ordinary, increased or decreased pressure. The availability of substantially two moles of the phosphine oxide for substantially each mole of the diamino compound is important for obtaining a polymer having the diazadiphosphetidine unit. An excess of the phosphine oxide over the two equimolar proportions with respect to the diamine may be used, since it can be easily recovered as unreacted material; but an excess of the diamine over the 2:1 phosphine oxide/diamine ratio is not recommended, since such an excess reduces the yield of the desired polymer by participating with the phosphine oxide in a reaction involving the replacement of only a portion of the amino hydrogens rather than all four of the hydrogens, as required in the formation of the diazadiphosphetidine structure.

The presently prepared polymers are resinous solids of high thermal stability. They generally do not soften below temperatures of, say, 250° C., and undergo little, if any, loss in weight when heated at temperatures which are well above 300 °C. The polymers are readily compression molded with heating to give well-dimensioned, smooth, shaped objects of high thermal stability and good mechanical strength. The polymers possess adhesive properties toward glass and metals, generally, and demonstrate high tenacity and bond-strength when used as adhesives in the production of laminates. The polymers may also be cast into films from solutions thereof, or fibers may be prepared therefrom by extruding the polymer into a precipitating bath. Coatings and fibers also may be obtained from the polymers by hot-melt techniques.

The invention is further illustrated by, but not limited to, the following examples.

*Example 1*

A flask equipped with a condenser and containing a mixture of 12.91 g., 0.05 mole, of diimidazol-1-ylphenylphosphine oxide, 5.01 g., 0.025 mole, of 4,4′-oxydianiline and 20.03 g. of quinoline was immersed in a 170° C. oil bath. Homogeneous solution occurred. The temperature was raised to 250° C. within a 1-hour period, and quinoline and by-product imidazole were then removed by heating under vacuum for 3.5 hours at a temperature which ranged up to 288° C. There was thus obtained as residue a polymer consisting essentially of the repeating unit.

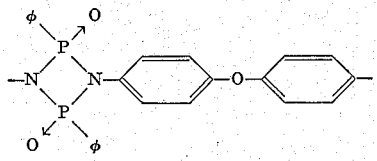

wherein φ denotes phenyl, a light yellow, tough solid which analyzed as follows:

| Percent | Found | Calc'd for $C_{24}H_{18}N_2O_3P_2$ |
|---|---|---|
| C | 64.70 | 64.87 |
| H | 4.34 | 4.08 |
| N | 6.34 | 6.30 |
| P | 14.09 | 13.94 |

The X-ray diffraction pattern indicated that the polymer was non-crystalline. The infrared spectrum was consistent with the presence of the 1,3,2,4-diazadiphosphetidine-2,4-dioxide in the backbone.

The polymer softened at 210° C. and began to melt at 240° C. The decomposition temperature of the polymer, determined by thermogravimetric analysis was found to be 390° C. The decomposition temperature is herein defined as that temperature at which initial weight loss occurs. Upon continuing the heating to 800° C. with a temperature increment of 3° C. per minute, the weight of the polymer had decreased to 56% of its original weight.

The polymer was ground to a fine powder and compression molded at a pressure of 10,000 p.s.i. and a temperature of <300° C. to an almost completely transparent light orange-brown non-brittle, well-dimensioned molded piece.

The polymer was tested as an adhesive for metal. A layer of the granulated polymer was placed between two strips of the same metal (copper or aluminum) and the assembly was heated between spring loaded compression plates, in a nitrogen atmosphere, to 300° C. and maintained at this temperature for an hour. Inspection of the laminate thus obtained showed that the polymer had flowed between the metal strips in a thin, uniform film. Determination of the bond strength by American Society for Testing Materials procedure D1002–53T and using an Instron tester for measuring loading at seal rupture gave a value of 330±50 p.s.i. for the aluminum laminate and a value of 639±9 p.s.i. for the copper laminate.

The polymer of this example was also found to possess excellent adhesive properties toward glass. Laminates prepared by coating one surface of a glass sheet with the molten polymer, superimposing another sheet of glass or a sheet of metal, e.g., copper, aluminum, or iron, upon the coated surface, and pressing the assembly were found to be tenaciously bonded structures.

Strong, heat-resistant laminates were also made by preparing a three-tier assembly of alternating layers of glass fiber textile and the granulated polymer and compression molding at a temperature of 300° C. The polymer melted, spread, and saturated the textile and formed an excellent bond.

The polymer was also drawn into flexible fibers from a melt thereof. Fibers are also formed by extruding a solution of the polymer, e.g., in quinoline, into a non-solvent, e.g., benzene.

*Example 2*

Diimidazol-1-ylphenylphosphine oxide (12.91 g., 0.050 mole) and 4,4′-oxydianiline (5.01 g., 0.025 mole) were charged to a flask which was equipped with an air-cooled condenser. The flask was connected to a nitrogen by-pass line and immersed in an oil bath at 176° C. Reaction started immediately. Initially, the reaction mixture acquired gel-like consistency, but as heating continued, it became a viscous, reddish-brown liquid. After 70 minutes of heating, during which time the temperature had been raised to 226° C., the system was evacuated to remove the by-product imidazole. The evacuation was continued for 65 minutes. The residue, a rigid foamy solid, was crushed and heated at 230° C. for four hours. There was thus obtained a hard, non-crystalline, polymer consisting essentially of the repeating unit

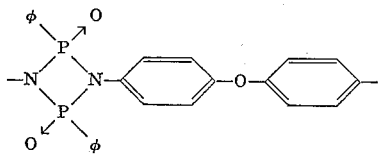

wherein $\phi$ denotes phenyl. The polymer analyzed 6.51% nitrogen, as against 6.30%, the calculated value for $C_{24}H_{18}N_2O_3P_2$, and softened and sintered when heated to 300° C. for one hour under vacuum.

*Example 3*

A mixture consisting of 2.70 g., 0.025 mole, of p-phenylenediamine, 12.91 g., 0.05 mole, of diimidazolyl-1-ylphenylphosphine oxide and 200 g. of quinoline was heated on the oil bath while increasing the temperature from 205° C. to 265° C. during an approximately 2-hour period. During this time the reaction mixture first became completely homogeneous, then turned to a polymer gel, and finally became a suspension of granulated solid in a liquid phase. Evacuation of the quinoline and imidazole was then initiated, and heating at from 265° C. to 293° C. was continued for about another two hours. The residue, a free-flowing, light-tan solid was a polymer consisting essentially of the repeating unit

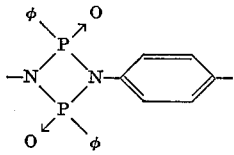

wherein $\phi$ denotes phenyl. The polymer did not melt when heated up to 360° C., but some decomposition was observed at 340–360° C.

*Example 4*

A mixture consisting of 12.91 g., 0.05 mole, of diimidazol-1-ylphenylphosphine oxide, 4.61 g., 0.025 mole, of benzidine and 20.49 g. of quinoline was prepared at room temperature. There was no evidence of reaction. The flask containing the mixture was immersed in a 140° C. bath and the temperature was raised to 275° C. within a 1.5-hour period. During this time there was first observed homogeneous solution and subsequently the appearance of a colorless, suspended solid. During the subsequent vacuum removal of quinoline and the by-product imidazole, the temperature was maintained at 275–288° C. for about 1.5 hours. There was thus obtained as residue 10.65 g. (99.4% theoretical yield) of polymer consisting essentially of the polymer unit

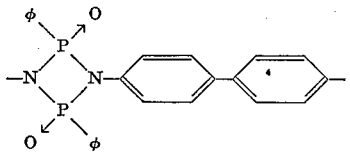

wherein $\phi$ denotes phenyl, a pale yellow, hard solid which analyzed as follows

| Percent | Found | Calc'd for $C_{24}H_{18}N_2O_2P_2$ |
|---|---|---|
| C | 67.22 | 67.29 |
| H | 4.36 | 4.23 |
| N | 6.47 | 6.54 |
| P | 14.25 | 14.46 |

X-ray diffraction analysis demonstrated that the polymer was essentially non-crystalline. Weak, broad and diffuse maxima were observed in the diffraction pattern, indicating some three-dimensional ordering.

The polymer was molded by heating it in a die to 350° C. at a pressure of 10,000 p.s.i. The hard, smooth, homogeneous, molded object had a density of 1.25 g./cm.³

*Example 5*

This example describes preparation of a polymer having both biphenylylene and phenyleneoxyphenylene radicals bridging the diazadiphosphetidine ring.

A mixture consisting of 250 g., 0.0125 mole, of 4,4'-oxydianiline, 2.30 g., 0.0125 mole, of benzidene, 12.91 g., 0.050 mole, of diimidazol-1-ylphenylphosphine oxide, and 20.04 g. of quinoline was heated on the oil bath at a temperature of 175° to 263° C. during a 1.5-hour period. Vacuum was then applied, and heating was continued at 275° to 285° C. for about 3.5 hours, at the end of which time quinoline and imidazole had ceased to evolve. The material was redissolved in quinoline and the solution was heated in a 280°–295° C. bath for 3 hours. Vacuum was applied and volatile materials were removed. There was thus obtained as residue a tough, caramel-brown, solid polymer consisting essentially of the repeating units

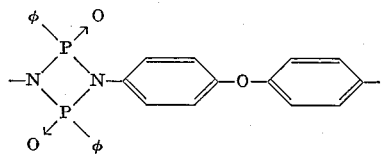

and

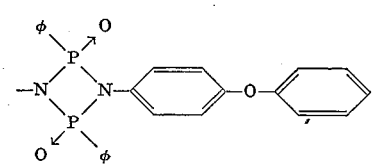

which analyzed as follows:

| Percent | Found | Calc'd for $C_{48}H_{36}N_4O_5P_4$ |
|---|---|---|
| C | 65.91 | 66.06 |
| H | 4.35 | 4.16 |
| N | 6.36 | 6.42 |
| P | 13.96 | 14.20 |

The above analysis shows the presence of both structural units.

The polymer was found to melt at 296°–303° C. It was compression molded at about 12,000 p.s.i. and a maximum temperature of 318° C. to a dark, brown disc having a density of 1.26 g./cm.³

*Example 6*

A mixture consisting of 12.91 g., 0.05 mole, of diimidazol-1-ylphenylphosphine oxide, 2.73 g., 0.025 mole, of 2,6-diaminopyridine and 20.1 g. of quinoline was heated in a nitrogen atmosphere on the oil-bath at a temperature of from 140° C. to 230° C. for 30 minutes, during which time the formation of a light-tan, suspended solid was observed. Heating was continued for another 1.5 hours while increasing the temperature to 267° C. At the end of this time, the solid had disappeared and the reaction mixture had been converted into a viscous, red solution. The solvent and imidazole were removed by evacuation at temperatures ranging to 305° C. The residue was semi-solid at this temperature, but upon cooling to room temperature it solidified to a red, hard resinous polymer consisting essentially of the repeating unit

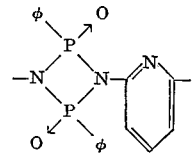

The polymer, which was obtained in quantitative yield, analyzed as follows:

| Percent | Found | Calc'd for $C_{17}H_{11}N_3O_2P_2$ |
|---|---|---|
| C | 57.68 | 57.80 |
| H | 3.86 | 3.71 |
| N | 11.79 | 11.90 |
| P | 17.36 | 17.54 |

The polymer was found to melt at 290–300° C. It was compression molded by applying a pressure of about 10,000 p.s.i. and heating to 300° C. The molded piece obtained thereby, a hard, homogeneous disc, had a density of 1.37 g./cm.³

In order to obtain comparative data, the above examples show only the use of quinoline as the solvent. However, other inert, organic liquids, e.g., phenyl ether or diglyme may be used instead. Also, neither the solvent nor the by-product imidazole need be removed by evacuation. The present polymers are insoluble in the common organic solvents, e.g., methanol, ethanol, benzene, toluene, hexane, acetone, ethyl ether, chloroform, carbon tetrachloride, tetrachloroethane, etc. Hence, even when the polymer is soluble in the reaction diluent, it can be easily separated by precipitating it from a non-solvent. The imidazole is much more soluble than are the polymers; removal of the by-product by washing is practicable. When operating in the presence of a diluent which is a non-solvent for the polymer or when using no diluent, the polymer tends to accumulate on the walls of the reaction vessel as a solid foam. Although mechanical manipulation suffices to break the foam, it is convenient to avoid such accumulation by working in the presence of a solvent for the polymer. Generally, the present polymers are soluble in quinoline.

It will be understood that the present polymers have wide application in the plastics and adhesives field and that the invention is not limited to use thereof in compression molding and metal or glass bonding. Paper, cloth, or wood may be impregnated with the polymers and bonded thereby by use of the herein described polymeric adhesives. Fillers, plasticizers, pigments, etc., may be employed with the polymers without excessive loss of dry bond strength or deterioration of the inherent thermal stability of the present polymers.

Since many widely different embodiments of this invention may be made without departing from the spirit and scope thereof, the invention is limited only as set forth in the following claims.

What is claimed is:

1. A solid, resinous polymer consisting essentially of the repeating unit

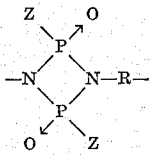

in which Z is an aromatic hydrocarbyl radical which is free of olefinic and acetylenic unsaturation, contains from 6 to 12 carbon atoms, and is linked through nuclear carbon to the remainder of the molecule, and R is selected from the class consisting of (1) arylene, aryleneoxyarylene and polyaryleneoxyarylene radicals of from 2 to 6 oxygen ether linkages, wherein each arylene radical is hydrocarbon, is free of olefinic and acetylenic unsaturation, contains from 6 to 12 carbon atoms and is linked through nonadjacent, nuclear carbon to the remainder of the molecule and (2) heterocyclic radicals having from 3 to 18 carbon atoms, from 5 to 6 members in a ring and from 1 to 3 nuclear, tertiary nitrogen atoms with the rest of the nuclear members being aromatic carbon, and being free of olefinic and acetylenic unsaturation and linked through non-adjacent, nuclear carbon to the remainder of the molecule.

2. A solid, resinous polymer consisting essentially of the repeating unit

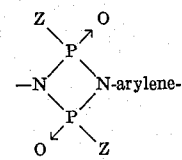

in which Z is an aromatic hydrocarbyl radical which is free of olefinic and acetylenic unsaturation, contains from 6 to 12 carbon atoms, and is linked through non-adjacent, nuclear carbon to the remainder of the molecule and arylene is hydrocarbon, is free of olefinic and acetylenic unsaturation, contains from 6 to 12 carbon atoms and is linked through nuclear carbon to the remainder of the molecule.

3. A solid, resinous polymer consisting essentially of the repeating unit

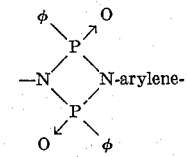

wherein $\phi$ denotes phenyl and arylene is hydrocarbon, is free of olefinic and acetylenic unsaturation, contains from 6 to 12 carbon atoms and is linked through non-adjacent, nuclear carbon to the remainder of the molecule.

4. A solid, resinous polymer consisting essentially of the repeating unit

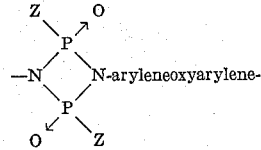

wherein Z in an aromatic hydrocarbyl radical which is free of olefinic and acetylenic unsaturation, contains from 6 to 12 carbon atoms, and is linked through nuclear carbon to the remainder of the molecule and arylene is hydrocarbon, is free of olefinic and acetylenic unsaturation, contains from 6 to 12 carbon atoms and is linked through non-adjacent nuclear carbon to the remainder of the molecule.

5. A solid, resinous polymer consisting essentially of the repeating unit

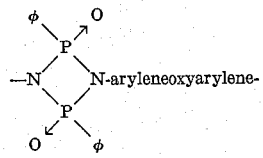

wherein $\phi$ denotes phenyl and arylene is hydrocarbon, is free of olefinic and acetylenic unsaturation, contains from 6 to 12 carbon atoms and is linked through non-adjacent nuclear carbon to the remainder of the molecule.

6. A solid, resinous polymer consisting essentially of the repeating unit

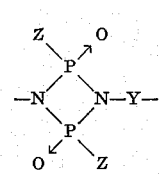

wherein Z is an aromatic hydrocarbyl radical which is free of olefinic and acetylenic unsaturation, contains from 6 to 12 carbon atoms, and is linked through non-adjacent, nuclear carbon to the remainder of the molecule and Y is a heterocyclic radical having from 3 to 18 carbon atoms, from 5 to 6 members in a ring, from 1 to 3 nuclear, tertiary nitrogen atoms with the rest of the nuclear members being aromatic carbon, and being free of olefinic and acetylenic unsaturation and linked through non-adjacent, nuclear carbon to the remainder of the molecule.

7. A solid, resinous polymer consisting essentially of the repeating unit

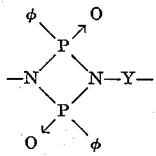

in which φ denotes phenyl and Y is a heterocyclic radical having from 3 to 18 carbon atoms, from 5 to 6 members in a ring and from 1 to 3 nuclear, tertiary nitrogen atoms with the rest of the nuclear members being aromatic carbon, and being free of aliphatic and acetylenic unsaturation and linked through non-adjacent, nuclear carbon to the remainder of the molecule.

8. A solid, resinous polymer consisting essentially of the repeating unit

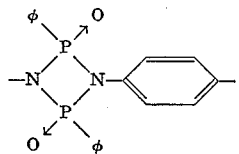

wherein φ denotes phenyl.

9. A solid, resinous polymer consisting essentially of the repeating unit

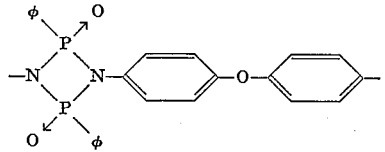

wherein φ denotes phenyl.

10. A solid, resinous polymer consisting essentially of the repeating unit

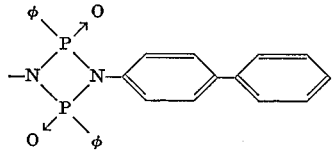

wherein φ denotes phenyl.

11. A solid, resinous polymer consisting essentially of the repeating unit

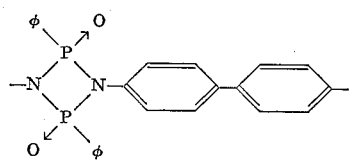

and

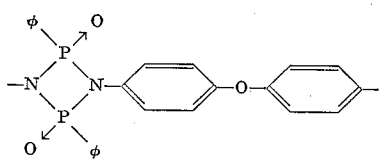

in which φ denotes phenyl.

12. A solid, resinous polymer consisting essentially of the repeating unit

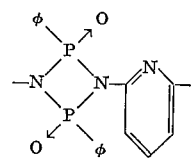

in which φ denotes phenyl.

13. The method which comprises heating 2,6-diaminopyridine with substantially two equimolar proportions of diimidazol-1-ylphenylphosphine oxide at a temperature of 100° to 400° C. and in the presence of an inert, organic liquid diluent, to obtain a solid, resinous polymer consisting essentially of the repeating unit

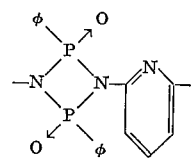

in which φ denotes phenyl.

No references cited.

SAMUEL H. BLECH, *Primary Examiner.*